(12) United States Patent
Deshmukh et al.

(10) Patent No.: US 8,082,464 B2
(45) Date of Patent: Dec. 20, 2011

(54) MANAGING AVAILABILITY OF A COMPONENT HAVING A CLOSED ADDRESS SPACE

(75) Inventors: Harish Deshmukh, Mountain View, CA (US); Sridhar Rajagopalan, Liverpool (GB); Roger C. Raphael, San Jose, CA (US); Chitrang Shah, San Carlos, CA (US); Paul S. Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 12/578,372

(22) Filed: Oct. 13, 2009

(65) Prior Publication Data

US 2011/0087919 A1  Apr. 14, 2011

(51) Int. Cl.
*G06F 11/00* (2006.01)
(52) U.S. Cl. ............... 714/4.1; 714/25; 714/42; 714/43; 714/44
(58) Field of Classification Search .................. 714/4, 7, 714/25, 42, 43, 44, 4.1
See application file for complete search history.

(56) References Cited

U.S. PATENT DOCUMENTS

| | | | |
|---|---|---|---|
| 6,604,207 B2 * | 8/2003 | Sheikh et al. | 714/1 |
| 6,847,993 B1 * | 1/2005 | Novaes et al. | 709/221 |
| 7,043,563 B2 | 5/2006 | Vange et al. | |
| 7,502,841 B2 | 3/2009 | Small et al. | |
| 7,518,987 B2 | 4/2009 | Biswas et al. | |
| 2002/0007468 A1 * | 1/2002 | Kampe et al. | 714/4 |
| 2003/0046230 A1 | 3/2003 | Jacobs et al. | |
| 2006/0168084 A1 | 7/2006 | Kogan et al. | |
| 2007/0041327 A1 | 2/2007 | Foster et al. | |
| 2007/0294563 A1 | 12/2007 | Bose | |
| 2009/0216910 A1 | 8/2009 | Duchesneau | |

FOREIGN PATENT DOCUMENTS

EP   1840741 A1   10/2007

OTHER PUBLICATIONS

Service Availability Forum Application Interface Specification, Availability Management Framework SAI-AIS-AMF-B.04.01, Oct. 21, 2008, http://www.saforum.org/HOA/assn16627/images/SAI-AIS-AMF-B.04.01.pdf, pp. 33,46,75,100,190,191,229,232.*
International Search Report and Written Opinion for Patent Cooperation Treaty Application Serial No. PCT/EP2010/062894 dated Dec. 17, 2010.

(Continued)

*Primary Examiner* — Charles Ehne
(74) *Attorney, Agent, or Firm* — Patterson & Sheridan, LLP

(57) ABSTRACT

Systems, methods and articles of manufacture are disclosed for managing availability of a component executing in a distributed system. The component may have an address space closed to the distributed system. In one embodiment, the component may be initiated. A state of the component may be analyzed to determine the availability of the component. The determined availability may be transmitted to the distributed system. The component may also be restarted responsive to a request from the distributed system to restart the component.

21 Claims, 5 Drawing Sheets

OTHER PUBLICATIONS

"Service Availability Forum Application Interface Specification: Availability Management Framework," AssociationVoice, Oct. 2008: pp. 1-13, 33-95 and 230-244, <http://www.saforum.org/HOA/assn16627/images/SAI-AIS-AMF-B.04.01.pdf>, retrieved Nov. 18, 2010. "Service Availability Forum: Specifications," AssociationVoice, Oct. 2008: pp. 1-4, <http://www.saforum.org/link/linkshow.asp?link_id=222259&assn_id=16627>, retrieved Nov. 18, 2010.

U.S. Appl. No. 12/855,241, filed Aug. 12, 2010, available in the image file wrapper.

Giorgos Kostopoulos and Odysseas Koufopavlou, NASS-IMS bundled Authentication Study through Core Network Concepts, Proceedings of the 3rd international conference on Mobile multimedia communications, Nafpaktos, Greece, Session: Security platforms for mobile multimedia table of contents, ACM International Conference Proceeding Series, vol. 329, Article No. 46, Year of Publication: 2007.

* cited by examiner

MANAGING AVAILABILITY OF A COMPONENT HAVING A CLOSED ADDRESS SPACE

BACKGROUND

1. Field of the Invention

Embodiments of the invention relate to distributed systems. More specifically, embodiments of the invention relate to techniques for managing availability of a component having a closed address space.

2. Description of the Related Art

Distributed systems include software components running on different computers and interacting with each other via a network, frequently as part of a larger distributed application. Examples of distributed applications include scalable information retrieval and/or document processing applications that exploit machine-level parallelism. In some cases, a distributed application may include a component that may be unable to participate in an availability protocol of the distributed application. Such a component may be said to have a "closed address space" (i.e., an address space that is closed to the distributed application). In other words, a component that has a closed address space refers to a component that, while deployed as a standalone process in the distributed system, may not be extended or modified to provide and/or manage availability of the component using the availability protocol of the distributed application.

A typical example of a component having a closed address space is a third party component deployed as part of a larger distributed application. For instance, the component may provide a service for converting documents or extracting information from documents. However, the component may be closed to modification and/or extension by a developer of the larger distributed application. For example, a vendor of the component may not provide any source code, software development kit, or integration hooks for the component that would allow the developer to modify or extend the component to provide and manage availability of (a runtime instance of) the component within the framework of the availability protocol of the larger distributed application. Put another way, the developer of the distributed application may be unable to modify or extend the component to participate in the availability protocol of the distributed application.

Often, the availability of the component executing in the closed address space affects availability of the larger distributed system. For example, an unresponsive component may cause the larger distributed system to behave less responsively and/or less reliably. Further, because the component executes in the closed address space, the distributed system may be unable to determine whether the component is hung. Consequently, the distributed system may be unable to determine whether a performance issue is caused by a dead or hung component, a hardware failure, etc. Because the distributed system may not take into account or otherwise manage the availability of the component, reliability of the distributed system may suffer.

SUMMARY

One embodiment of the invention includes a computer-implemented method. The method may generally include configuring one or more computer processors to perform an operation for managing availability of a component executing in a distributed system, the component having an address space closed to the distributed system. The operation may generally include monitoring one or more availability indications of the component within the distributed system; analyzing the one or more availability indications of the component; and assigning an availability state to the component within the distributed system based on the of the one or more availability indications of the component. The operation further includes assigning an availability state to the component selected from at least: (i) a first availability state indicating that the component is healthy; (ii) a second availability state indicating that the component is hung; and (iii) a third availability state indicating that the component is dead.

Other embodiments of the invention include a system and a computer-readable storage medium containing a program, which, when executed on a processor, performs the operation for managing availability of a component executing in a distributed system described above.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
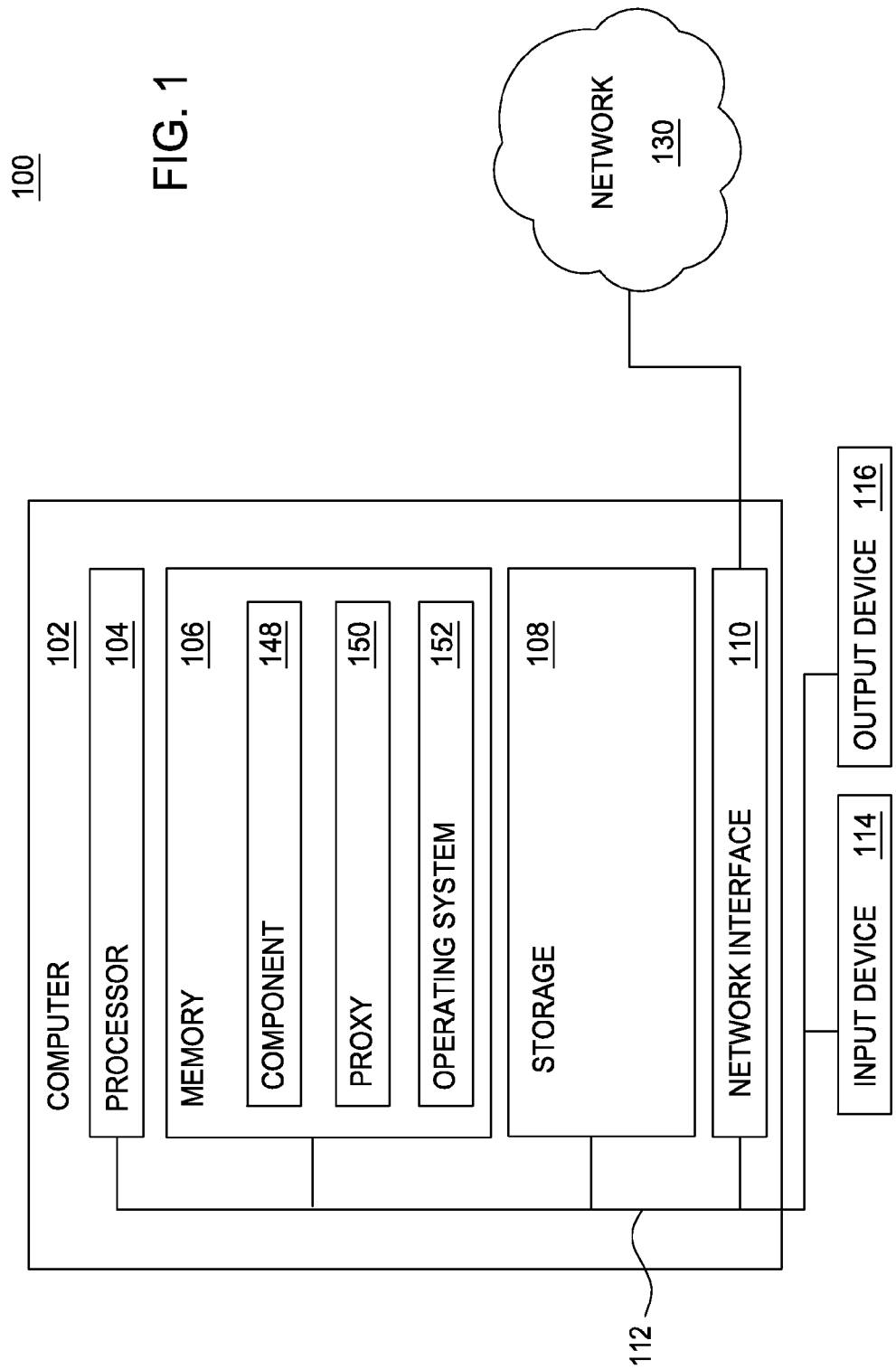
FIG. 1 is a block diagram illustrating a system for managing availability of a component, according to one embodiment of the invention.

Embodiments of the invention provide techniques for managing availability of a component having a closed address space. One embodiment of the invention provides a proxy for the component in the distributed system. The proxy may initiate the component. Further, the proxy may analyze a state of the component to determine the availability of the component. The proxy may also transmit the determined availability to the rest of the distributed system. For example, the proxy may adhere to (and participate in) an availability protocol specified by the distributed system. Accordingly the distributed system may monitor, via the proxy, the health and availability of the component having the closed address space.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for managing availability of a component, according to one embodiment of the invention. The system 100 includes a computer 102. The computer 102 may be connected to other computers via a network 130. The computer 102 and the other computers may constitute a distributed system. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 152. Examples of operating systems 152 include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a component 148, a proxy 150, and the operating system 152. As used herein, the component 148 refers to a process, i.e., an instance of the component executing on the computer 102. In one embodiment, the component 148 may be a server component that executes in an address space that is closed to the distributed system. As used herein, a component refers to a software application that encapsulates a set of related functions (and/or data). An example of a component is a software application that provides a service to one or more applications locally and/or via the network 130 (i.e., a server component). The component 148 may also be closed to modification and/or extension by a developer of the distributed application. In one embodiment, the proxy 150 may be a process that analyzes a state of the component 148 to determine availability of the component 148 (e.g., whether the component 148 is available to participate in the larger distributed application). The proxy 150 may also transmit the determined availability (or other information related to the state of the component 148) to the rest of the distributed system (e.g., using an availability protocol of the distributed system). In other words, the proxy 150 shadows the component 148 executing in the distributed system and represents the component 148 in the availability protocol of the distributed system. Accordingly, the distributed system may manage the availability of the component 148 via the proxy 150. For example, upon receiving an indication that the component 148 is hung, the distributed system may request the proxy 150 to restart the component 148.

Figure 2:
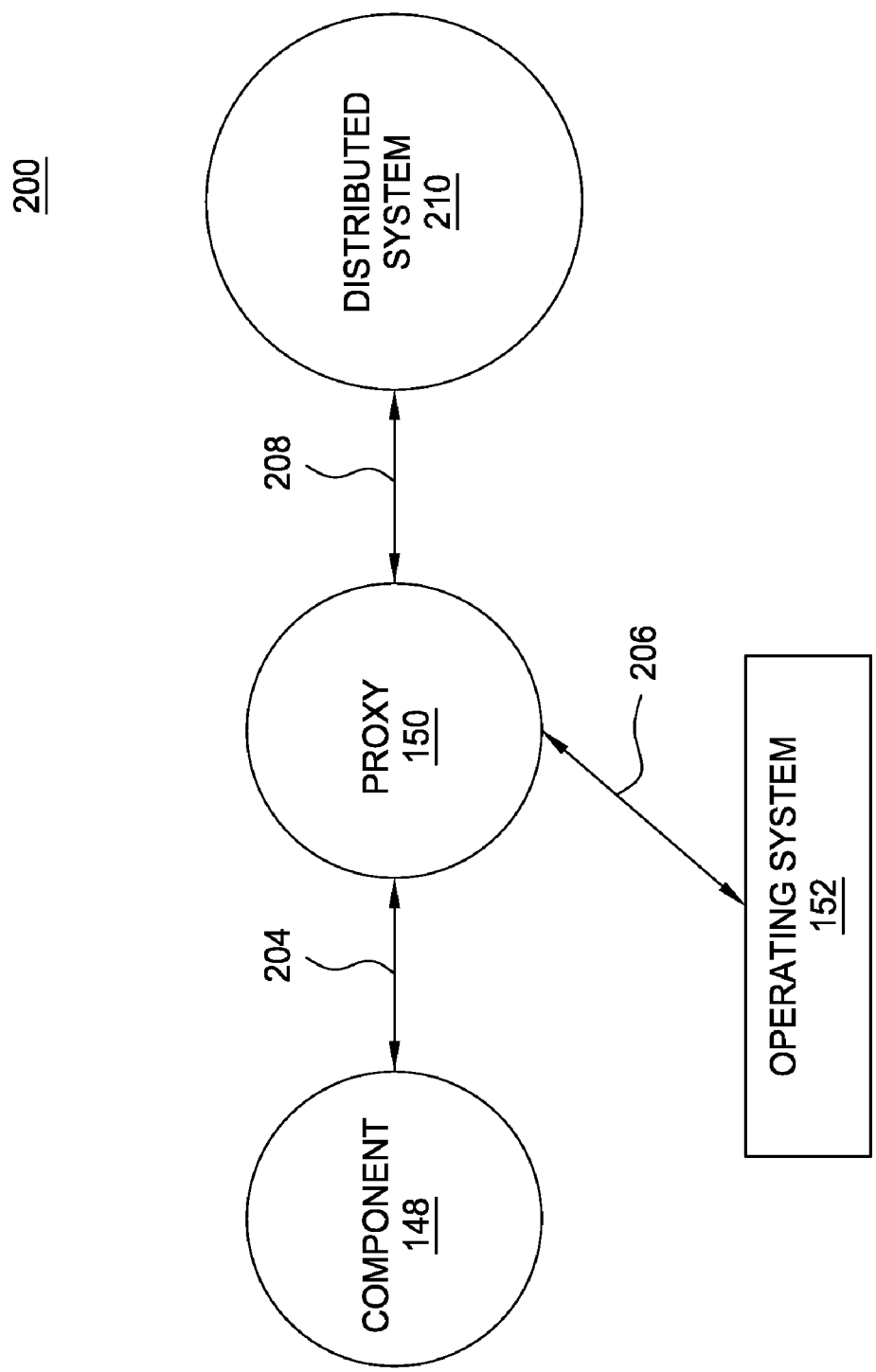
FIG. 2 illustrates a data flow for a proxy for the component, according to one embodiment of the invention.

FIG. 2 illustrates a data flow 200 for the proxy 150 of FIG. 1, according to one embodiment of the invention. As shown, the data flow 200 includes the component 148, the proxy 150, the operating system 152, and the (rest of the) distributed system 210. In one embodiment, the proxy 150 may use inter-process communication with the component 148 (represented by an arrow 204) to analyze a state of the component 148. The proxy 150 may also use operating system primitives (represented by an arrow 206) to analyze the state of the component 148. Inter-process communication and operating system primitives are further described below. The proxy may also participate in the availability protocol (represented by an arrow 208) of the distributed system 210.

While embodiments are described herein with reference to the C++ programming language, those skilled in the art will recognize that other programming languages may be supported without departing from the scope of the invention.

As described above, the proxy 150 may use inter-process communication with the component 148 to analyze a state of the component 148, according to one embodiment. As is known, inter-process communication (IPC) refers to a set of techniques for exchanging data between multiple threads in one or more processes. The processes may execute on one or more computers connected via a network. One example of inter-process communication is redirecting a shared library. One example of a shared library is a dynamic-link library (DLL) in a Windows® environment. In UNIX-like environments, a shared library is also referred to as a shared object; consequently, a .so filename extension often identifies a shared library file in UNIX-like environments.

Suppose that the component 148 calls functions provided by the shared library. In one embodiment, the proxy 150 may intercept the function calls via a wrapper library for the shared library. As is known, a wrapper library for a shared library provides the same function signatures as the shared library. As is known, a function signature refers to the name of a function, the type and order of parameters of a function, and the type of return value of a function. For each function in the wrapper library, however, the wrapper library may provide additional functionality. The wrapper library may also call a corresponding function in the shared library. The proxy 150 may analyze the intercepted function calls (via the wrapper library) to determine progression of a process and/or thread of the component 148, according to one embodiment. Consequently, the proxy 150 may determine the availability of the component 148 (e.g., whether the component is in a healthy, hung, or other state).

Another example of inter-process communication is commonly referred to as pipes. As is known, a pipe refers to a set of processes chained by standard streams of the processes, so that the output of each process feeds directly as input to the next process. A pipe typically exists anonymously and persists only for as long as the processes are executing. Thus, a pipe is sometimes referred to as an "unnamed pipe." A named pipe, on the other hand, is system-persistent and exists beyond execution of the processes. Processes may generally attach to the named pipe to perform inter-process communication with other processes. Once the named pipe is no longer being used, a process may also delete the named pipe.

For example, in a UNIX like environment, the component 148 may create a named pipe via calling a mkfifo( ) function. As is known, the mkfifo( ) function creates a new named pipe based on a pathname and an access mode (which the component 148 may specify). For instance, if the specified access mode permits read and write access by all users, any process may use the named pipe to send and/or receive data (i.e., with any other process that also uses the named pipe). For example, the proxy 150 may call an open( ) function to open the named pipe and use file I/O functions (e.g., read( ), write( ), close( ), etc.) to access the named pipe. Once the component 148 no longer needs the named pipe, the component 148 may remove the named pipe via calling an unlink( ) function. As is known, the unlink( ) function deletes files.

In one embodiment, the proxy 150 may detect whether a named pipe exists. For example, the proxy 150 may determine if calling the open( ) function to open the named pipe returns an error; if so, the named pipe may not exist. If the named pipe exists, the proxy 150 may determine that the component 148 is healthy (i.e., executing normally; not dead or hung). Otherwise, the proxy 150 may determine that the component 148 is dead or hung. In other words, the proxy 150 may infer the availability of the component 148 from the named pipe. Consequently, the proxy 150 may more accurately determine the availability of the component 148 (e.g., by using both a shared library and a named pipe). Of course, those skilled in the art will recognize that the way of determining the availability of the component 148 via named pipes may be tailored to suit the needs of a particular case.

As described above, the proxy 150 may also use operating system primitives to analyze the state of the component 148, according to one embodiment. As used herein, an operating system primitive refers to a function or event that is supported by the operating system. One example of an operating system primitive is a kill function supported by many UNIX-like operating systems. As is known, the kill function sends a termination signal to a process or a group of processes. A signature for the kill function may be int kill (pid_t pid, int sig).

In one embodiment, the proxy 150 may call the kill function to analyze the availability of the component 148. Specifically, the proxy 150 may call kill (pid, 0). The first argument, pid, is the process identifier for the component 148. The second argument, 0, specifies that no termination signal is to be sent to the component 148 (and consequently, only validity of pid is checked). The kill function returns a value indicating whether the process identifier is valid. From the returned value, the proxy 150 may determine whether the component 148 has terminated (as of the time of validating the process identifier).

Another example of an operating system primitive is a function for opening a process in debug mode. The proxy 150 may obtain sufficient authority (granted by the operating system, e.g., superuser authority) to open the process (i.e., a runtime instance of the component 148) in debug mode, thereby gaining control over the process. For instance, versions of the Windows® operating system include a Windows application programming interface (API) that supports a DebugActiveProcess function. As is known, the DebugActiveProcess function enables a debugger to attach to an active process and debug the active process. A signature for the DebugActiveProcess function is BOOL WINAPI DebugActiveProcess(_in DWORD dwProcessId).

In one embodiment, the proxy 150 may call the DebugActiveProcess function to analyze the availability of the component 148. The formal parameter, dwProcessId, is the process identifier for the component 148. The proxy 150 may attach to the component 148 and debug the attached component 148. That is, the proxy 150 may probe the closed address space of the attached component 148 using functions provided by the debugger. For example, the proxy 150 may determine whether the process (and/or a thread) of the component 148 is progressing as opposed to hanging (e.g., in terms of executing instructions). The proxy 150 may also determine whether the process (and/or a thread) of the component 148 is waiting on any outstanding request(s). Consequently, the proxy 150 may determine whether the component 148 is healthy or hung. Of course, those skilled in the art will recognize that the way of determining the availability of the component 148 via opening a process in debug mode may be tailored to suit the needs of a particular case.

UNIX-like operating systems may also support interrogating a process state. For instance, many UNIX-like operating systems support a process file system (or procfs for short). As is known, procfs refers to a pseudo file system (i.e., a file system generated at boot time) for accessing process level related information via the kernel of the operating system. The pseudo file system is often mounted at a /proc directory in UNIX-like environments. The proxy 150 may be configured with authority to access the pseudo file system, according to one embodiment.

In one embodiment, the proxy 150 may construct profiles of the component 148 information stored by the operating system in the procfs file system. Each profile may correspond to a different state of the component 148 (e.g., healthy, hung, etc.). Each profile may also include information about the component 148 that is typically observed for a given state (healthy, hung, etc.). For example, the information may include state, progression in terms of executing instructions, hardware utilization, etc. The proxy 150 may then detect behavior of the component 148. For example, the proxy 150 may examine threads and extract samples of resources used by the component 148. Examples of typical resources include instantaneous stack traces, context switches, execution cycles etc. The proxy 150 then may compare the detected behavior with the constructed (historic) profiles to determine the availability of the component 148. Of course, those skilled in the art will recognize that the way of determining the availability of the component 148 via interrogating a state of the process may be tailored to suit the needs of a particular case.

Yet another example of an operating system primitive is an event supported by the operating system. For example, an event may indicate that a child process has terminated. As is known, SIGCHLD is a signal sent by the kernel of a UNIX like operating system to a parent process when a child process of the parent process terminates. A child process is created when one process (the parent) "forks" another process (the child). The operating system monitors the child process, and when the child process terminates, the kernel sends the SIGCHLD signal to the parent.

In one embodiment, the proxy 150 may be configured to initiate execution of the component 148. For example, the proxy 150 may fork the component 148 as a child process (and thus become a parent process of the component 148). Upon receiving a SIGCHLD signal from the kernel, the proxy 150 may determine that the component 148 has terminated (whether gracefully, abnormally, etc.). Of course, other ways of determining the availability of the component 148 from system events are broadly contemplated without departing from the scope of the invention.

Further, the proxy 150 may combine multiple techniques to determine the availability of the component 148, according to one embodiment. For example, the proxy 150 may use inter-process communication in conjunction with operating system primitives. In doing so, the proxy 150 may more accurately determine availability of the component 148. Of course, the way of combining multiple techniques to determine a comprehensive availability state of the component 148 may be tailored to suit the needs of a particular case.

Figure 3:
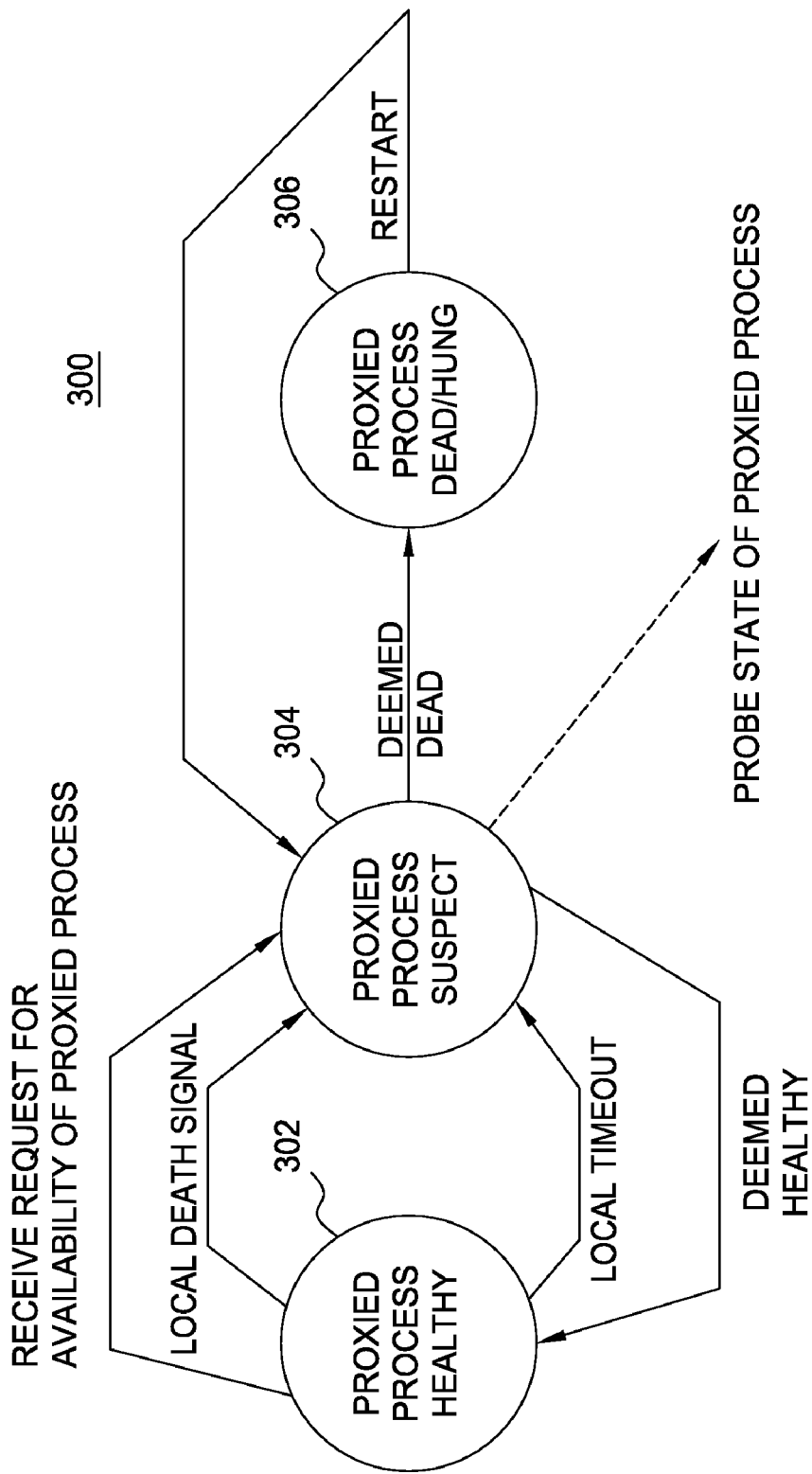
FIG. 3 is a state diagram for the proxy, according to one embodiment of the invention.

FIG. 3 is a state diagram 300 for the proxy 150 of FIG. 1, according to one embodiment of the invention. As shown, the state diagram 300 includes a healthy state 302, a suspect state 304, and a dead/hung state 306. As used herein, the states 302, 304, 306 correspond to the states of the component 148 (as determined by the proxy 150). The component 148 may also be referred to herein as a "proxied process."

As shown, the proxy 150 may transition from a healthy state 302 to a suspect state 304 upon receiving a signal (e.g., SIGCHLD) from the operating system 152. The proxy 150 may also transition from a healthy state 302 to a suspect state 304 upon receiving a request (from the distributed system 210) for the availability of the component 148. The proxy 150 may also transition from a healthy state 302 to a suspect state 304 upon determining that a "timeout" period has elapsed. The timeout period refers to a predefined time period beyond which a previously determined availability of the component 148 (e.g., healthy) is no longer deemed to be accurate. In other words, once the predefined time period is exceeded, the proxy 150 may re-determine the availability of the component 148 and transition the state of component 148 to a "suspect" state until the determination is complete.

In one embodiment, the proxy 150 may probe and/or analyze the state of the component 148 to determine the availability of the component 148. For example, the proxy 150 may use inter-process communication and/or operating system primitives to probe and/or analyze the state of the component 148. Further, the proxy 150 may transition from the suspect state 304 to the healthy state 302 upon determining that the component 148 is healthy. Similarly, the proxy 150 may transition from the suspect state 304 to the dead/hung state 306 upon determining that the component 148 is dead/hung. The proxy 150 may transition from the dead/hung state 306 to the suspect state 304 upon restarting the component 148.

Other embodiments are broadly contemplated without departing from the scope of the invention. In one embodiment, the distributed system may also control availability of the component 148 via the proxy 150. For example, the distributed system may request to start, stop, or restart the component 148 via the proxy 150. Further, the proxy 150 may restart the component 148 in a manner transparent to the distributed system. For example, the proxy 150 may restart the component 148 upon determining that no the component 148 is not healthy and that no request is currently pending from the distributed system for the availability of the component 148.

Figure 4:
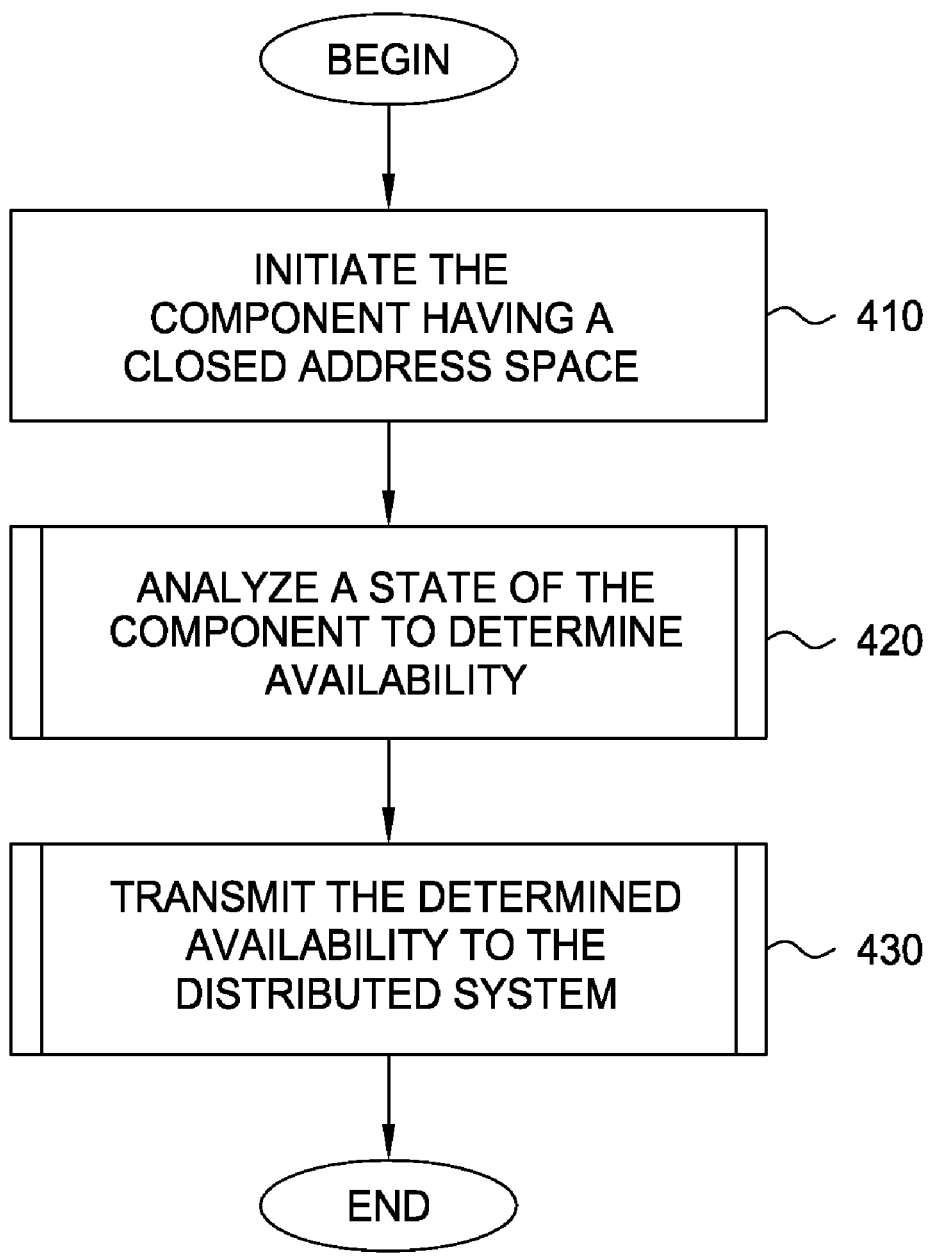
FIG. 4 is a flowchart depicting a method for determining availability of the component, according to one embodiment of the invention.

FIG. 4 is a flowchart depicting a method 400 for determining availability of the component 148 of FIG. 1, according to one embodiment of the invention. As shown, the method 400 begins at step 410, where the proxy 150 initiates execution of the component 148 having a closed address space. At step 420, the proxy 150 analyzes a state of the component 148 to determine an availability of the component 148. At step 430, the proxy 150 transmits the determined availability to the distributed system. After the step 430, the method 400 terminates.

Figure 5:
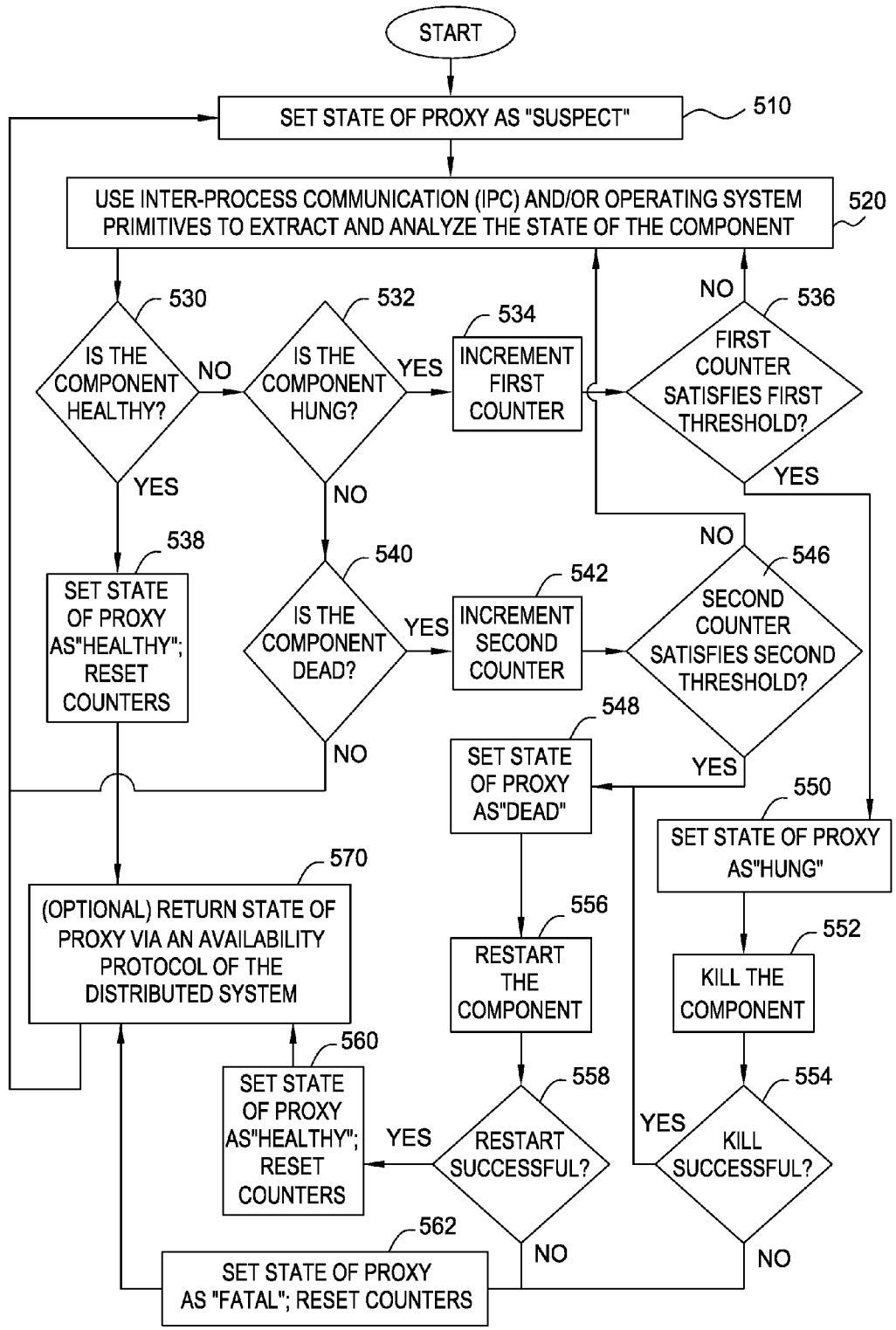
FIG. 5 is a flowchart depicting a method for analyzing a state of the component, according to one embodiment of the invention.

FIG. 5 is a flowchart depicting a method 500 for analyzing the state of the component 148 of FIG. 1, according to one embodiment of the invention. The method 500 corresponds to the steps 420 and 430 of FIG. 4. Method 500 illustrates an example embodiment where the proxy 150 transitions among five possible states: "suspect," "healthy," "hung," "dead," and "fatal," according to one embodiment of the invention.

As shown, the method 500 begins at step 510, where the proxy 150 transitions to a "suspect" state (which represents an availability of the component 148, as determined by the proxy 150). The "suspect" state indicates that the proxy 150 has not yet determined the state of the component 148.

At step 520, the proxy 150 uses inter-process communication and/or operating system primitives to extract and analyze the state of the component 148. More generally, the application 150 may use inter-process communication and/or operating system primitives to extract and/or analyze the state of the component 148 throughout the method 500 to determine the state of the component 148 (e.g., at steps 530, 532, 536, 540, 546, 554, 558, which are described below).

At step 530, the proxy 150 determines whether the component 148 is healthy based on the analysis of the step 520. If so, the proxy 150 transitions to a "healthy" state (step 538) and resets counters (e.g., a first counter and a second counter, described below). The proxy may also transmit the "healthy" state to the distributed system via an availability protocol of the distributed system (step 570).

On the other hand, if the proxy 150 determines that the component 148 is not healthy (step 530), then at step 532, the proxy 150 determines whether the component is hung. In one embodiment, to reduce the effect of noise in the system on availability determination, the proxy 150 transitions to a "hung" state only upon having made a threshold count of determinations that the component is hung. For example, if the proxy 150 determines that the component 148 is hung (step 532), the proxy 150 increments a first counter (step 534) and checks whether the first counter satisfies a first threshold (step 536). If the first threshold is not satisfied, the method 500 returns to the step 520 to reevaluate the component 148. Of course, those skilled in the art will recognize that the threshold count may be tailored to suit the needs of a particular case. However, a threshold count of three or four hang determinations has proven useful in some cases.

Alternatively, if the first threshold is satisfied (step 536), the proxy 150 transitions the component 148 to a to a "hung" state (step 550). At step 552, the proxy 150 may attempt to kill the hung component. If the hung component is not successfully killed (step 554), the proxy 150 may transition to a "fatal" state (step 562) and reset counters (e.g., the first counter and the second counter). As used herein, the "fatal" state refers to an error condition of the component 148 as determined by the proxy 150. In addition, the proxy 150 may transmit the "fatal" state to the distributed system via an availability protocol used by the distributed system (step 570) to monitor the availability of each component that contributes to the distributes system. If the hung component is successfully killed (step 554), the proxy 150 may transition to a "dead" state (step 548) and attempt to restart the component 148 (step 556).

In one embodiment, the proxy 150 transitions to the "fatal" state upon satisfying a threshold count of determinations that the component 148 has not been killed successfully (e.g., based on a third counter maintained by the proxy 150). That is, the proxy 150 transitions to the "fatal" state after multiple, unsuccessful attempts at killing the component 148.

On the other hand, if the proxy 150 determines that the component 148 is not hung (step 532), then at step 540, the proxy 150 determines whether the component 148 is dead. If so, the proxy 150 simply returns to the step 510 to transition to a "suspect" state.

Otherwise, to reduce the effect of noise in the system on availability determination, the proxy 150 transitions to a "dead" state only upon having a made a threshold count of determinations that the component is dead, according to one embodiment. For instance, if the proxy 150 determines that the component 148 is dead (step 540), the proxy 150 increments a second counter (step 542) and checks whether the second counter satisfies a second threshold (step 546). If the second threshold is not satisfied, the method 500 returns to the step 520 to reevaluate the component 148. Of course, those skilled in the art will recognize that the threshold count may be tailored to suit the needs of a particular case. However, a threshold count of two death determinations has proven useful in some cases.

Alternatively, if the second threshold is satisfied (step 546), the proxy 150 transitions to a "dead" state (step 548). At step 556, the proxy 150 may attempt to restart the (dead) component 148. If the component 148 is not successfully restarted (step 558), the proxy 150 may transition to the "fatal" state (step 562) and reset counters (e.g., the first counter and the second counter). Further, the proxy 150 may transmit the "fatal" state to the distributed system via the availability protocol of the distributed system (step 570). Of course, those skilled in the art will recognize that the way of transitioning to the "fatal" state may be tailored to suit the needs of a particular case. For example, in one embodiment, the proxy 150 may transition to the "fatal" state only upon satisfying a threshold count of determinations that the component 148 is not successfully restarted (e.g., based on a fourth counter maintained by the proxy 150). That is, the proxy 150 transitions to the "fatal" state only upon multiple unsuccessful attempts at restarting the component 148.

On the other hand, if the restart is successful (step 558), the proxy 150 transitions to a "healthy" state (step 560) and resets counters (e.g., the first counter and the second counter). The proxy 150 may also transmit the "healthy" state to the distributed system via the availability protocol of the distributed system (step 570). After the step 570, the method 500 may return to the step 510 for the proxy 150 to reevaluate the component 148.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for managing the availability of a component executing in a distributed system. The component may have an address space closed to the distributed system. One embodiment of the invention provides a proxy. In one embodiment, the proxy initiates the component. The proxy may analyze a state of the component to determine the availability of the component. The proxy may transmit the determined availability to the distributed system via an availability protocol of the distributed system. Accordingly, the distributed system may monitor, via the proxy, the availability of the component having the closed address space. The distributed system may also control the availability of the component via the proxy.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
configuring one or more computer processors to perform an operation for managing availability of a component executing in a distributed system, the component having an address space closed to the distributed system, wherein the operation comprises:
monitoring one or more availability indications of the component within the distributed system;
analyzing the one or more availability indications of the component;
assigning an availability state to the component within the distributed system based on the of the one or more availability indications of the component; and
assigning an availability state to the component selected from at least:
(i) a first availability state indicating that the component is healthy;
(ii) a second availability state indicating that the component is hung; and
(iii) a third availability state indicating that the component is dead.

2. The computer-implemented method of claim 1, wherein the operation further comprises:
initiating execution of the component having the closed address space.

3. The computer-implemented method of claim 1, wherein the operation further comprises:
transmitting the assigned availability state to a second component executing in the distributed system via an availability protocol employed by the distributed system.

4. The computer-implemented method of claim 1, wherein the one or more availability indications of the component are monitored via calling one or more operating system primitives to probe the closed address space of the component.

5. The computer-implemented method of claim 1, wherein the operation further comprises, upon determining that the availability state assigned is the second availability state:
killing the component having the closed address space; and
restarting the component having the closed address space.

6. The computer-implemented method of claim 1, wherein the operation further comprises:
receiving a request from a second component executing in the distributed system to restart the component having the closed address space; and
restarting the component having the closed address space.

7. The computer implemented method of claim 1, wherein analyzing the one or more availability indications of the component comprises determining a progression of the component by at least one of:
analyzing function calls made by the component, wherein the function calls are intercepted by a wrapper library;
evaluating whether a named pipe exists, wherein the component attaches to the named pipe to perform inter-process communication (IPC); and
probing the closed address space of the component in a debug mode and using an operating system primitive.

8. The computer implemented method of claim 7, wherein the progression is selected from a process progression and a thread progression.

9. The computer implemented method of claim 1, wherein analyzing the one or more availability indications of the component comprises determining a progression of the component by:
analyzing function calls made by the component, wherein the function calls are intercepted by a wrapper library;
evaluating whether a named pipe exists, wherein the component attaches to the named pipe to perform inter-process communication (IPC); and
probing the closed address space of the component in a debug mode and using an operating system primitive.

10. A computer-readable storage medium containing a program, which, when executed on a processor, performs an operation for managing availability of a component executing in a distributed system, wherein the operation comprises:
monitoring one or more availability indications of the component within the distributed system, wherein the component has an address space closed to the distributed system;

analyzing the one or more availability indications of the component;

assigning an availability state to the component within the distributed system based on the of the one or more availability indications of the component; and assigning an availability state to the component selected from at least:

(i) a first availability state indicating that the component is healthy;

(ii) a second availability state indicating that the component is hung; and (iii) a third availability state indicating that the component is dead.

11. The computer-readable storage medium of claim 10, wherein the operation further comprises:

initiating execution of the component having the closed address space.

12. The computer-readable storage medium of claim 10, wherein the operation further comprises:

transmitting the assigned availability state to a second component executing in the distributed system via an availability protocol employed by the distributed system.

13. The computer-readable storage medium of claim 10, wherein the one or more availability indications of the component are monitored via calling one or more operating system primitives to probe the closed address space of the component.

14. The computer-readable storage medium of claim 10, wherein the operation further comprises, upon determining that the availability state assigned is the second availability state:

killing the component having the closed address space; and restarting the component having the closed address space.

15. The computer-readable storage medium of claim 10, wherein the operation further comprises:

receiving a request from a second component executing in the distributed system to restart the component having the closed address space; and restarting the component having the closed address space.

16. A system, comprising:

one or more computer processors; and a memory containing a program, which when executed by the one or more computer processors is configured to perform an operation for managing availability of a component executing in a distributed system, the component having an address space closed to the distributed system, wherein the operation comprises:

monitoring one or more availability indications of the component within the distributed system;

analyzing the one or more availability indications of the component;

assigning an availability state to the component within the distributed system based on the of the one or more availability indications of the component; and assigning an availability state to the component selected from at least:

(i) a first availability state indicating that the component is healthy;

(ii) a second availability state indicating that the component is hung; and (iii) a third availability state indicating that the component is dead.

17. The system of claim 16, wherein the operation further comprises:

initiating execution of the component having the closed address space.

18. The system of claim 16, wherein the operation further comprises:

transmitting the assigned availability state to a second component executing in the distributed system via an availability protocol employed by the distributed system.

19. The system of claim 16, wherein the one or more availability indications of the component are monitored via calling one or more operating system primitives to probe the closed address space of the component.

20. The system of claim 16, wherein the operation further comprises, upon determining that the availability state assigned is a hung state the second availability state:

killing the component having the closed address space; and restarting the component having the closed address space.

21. The system of claim 16, wherein the operation further comprises:

receiving a request from a second component executing in the distributed system to restart the component having the closed address space; and restarting the component having the closed address space.

* * * * *